US010323749B2

(12) United States Patent
Maloney et al.

(10) Patent No.: US 10,323,749 B2
(45) Date of Patent: Jun. 18, 2019

(54) SEAL WITH SIDING CHANNEL

(71) Applicants: Marc E. Maloney, Wakarusa, IN (US);
Raymond Young, Wanatah, IN (US);
Makato Sato, Bloomfield, MI (US);
Faron F. Frey, Goshen, IN (US)

(72) Inventors: Marc E. Maloney, Wakarusa, IN (US);
Raymond Young, Wanatah, IN (US);
Makato Sato, Bloomfield, MI (US);
Faron F. Frey, Goshen, IN (US)

(73) Assignee: JAEGER-UNITEK SEALING SOLUTIONS, INC., Laporte, IN (US)

(*) Notice: Subject to any disclaimer, the term of this patent is extended or adjusted under 35 U.S.C. 154(b) by 0 days.

(21) Appl. No.: 15/705,817

(22) Filed: Sep. 15, 2017

(65) Prior Publication Data

US 2018/0080558 A1 Mar. 22, 2018

Related U.S. Application Data

(60) Provisional application No. 62/395,797, filed on Sep. 16, 2016.

(51) Int. Cl.
| *F16J 15/50* | (2006.01) |
| *F16J 15/02* | (2006.01) |
| *B60J 10/86* | (2016.01) |
| *B60J 10/00* | (2016.01) |
| *B60P 3/34* | (2006.01) |

(52) U.S. Cl.
CPC ............ *F16J 15/027* (2013.01); *B60J 10/00* (2013.01); *B60J 10/86* (2016.02); *B60P 3/34* (2013.01)

(58) Field of Classification Search
CPC ............ F16J 15/027; B60J 10/86; B60P 3/34
See application file for complete search history.

(56) References Cited

U.S. PATENT DOCUMENTS

| 3,177,534 | A | 4/1965 | Millhouse et al. |
| 4,699,818 | A | 10/1987 | Evans et al. |
| 5,441,685 | A | 8/1995 | Miyakawa et al. |
| 5,736,215 | A | 4/1998 | Buchholz et al. |
| 6,878,428 | B2 | 4/2005 | Hope |
| 7,419,202 | B1 | 9/2008 | Hanser et al. |
| 7,614,676 | B2 * | 11/2009 | Ksiezopolski ............ B60P 3/34 296/171 |
| 7,614,677 | B2 * | 11/2009 | Ksiezopolski ............ B60P 3/34 296/171 |
| 7,669,370 | B2 | 3/2010 | Oba et al. |
| 8,701,351 | B2 | 4/2014 | Siegel |
| 8,875,443 | B2 * | 11/2014 | Siegel .................... B60R 13/08 296/165 |

(Continued)

OTHER PUBLICATIONS

Lauren Manufacturing, www.lauren.com/solutions/extruded-capabilities/dual-durometers/, Aug. 27, 2016; 6 pgs.

*Primary Examiner* — Gilbert Y Lee
(74) *Attorney, Agent, or Firm* — Vedder Price P.C.

(57) ABSTRACT

A seal useful in sealing slide out rooms may be used singularly or in pairs to straddle a wall through which the opening is located. The seal includes a co-extruded block of deformable material in a channel. The channel is configured to receive the siding of an outer wall whereby the siding deforms the block of deformable material to create a seal inside the channel of the seal.

16 Claims, 7 Drawing Sheets

(56) References Cited

U.S. PATENT DOCUMENTS

| | | | |
|---|---|---|---|
| 8,910,422 B2 * | 12/2014 | Siegel | B60P 3/32 |
| | | | 277/649 |
| 8,985,662 B2 | 3/2015 | Siegel | |
| 9,033,390 B1 | 5/2015 | Ksiezopolski | |
| 9,038,322 B2 | 5/2015 | Ksiezopolski | |
| 9,045,027 B2 | 6/2015 | Young et al. | |
| D741,231 S * | 10/2015 | Schoonover | D12/106 |
| 9,321,209 B2 | 4/2016 | Schoonover et al. | |
| 9,409,532 B2 | 8/2016 | Ksiezopolski | |
| 9,625,037 B2 * | 4/2017 | Young | F16J 15/027 |
| 9,725,026 B2 * | 8/2017 | Ksiezopolski | B60P 3/36 |
| 2002/0061385 A1 | 5/2002 | Cook | |
| 2008/0048464 A1 | 2/2008 | Kseizopolski et al. | |
| 2014/0097578 A1 * | 4/2014 | Young | F16J 15/027 |
| | | | 277/628 |
| 2015/0260287 A1 * | 9/2015 | Young | F16J 15/027 |
| | | | 277/312 |
| 2015/0291236 A1 | 10/2015 | Kseizopolski | |
| 2016/0046056 A1 | 2/2016 | Schoonover et al. | |
| 2016/0114715 A1 | 4/2016 | Newhouse | |
| 2016/0201893 A1 | 7/2016 | Ksiezopolski | |
| 2016/0207438 A1 | 7/2016 | Ksiezopolski | |
| 2016/0243974 A1 | 8/2016 | Goode et al. | |

* cited by examiner

SEAL WITH SIDING CHANNEL

CROSS REFERENCE TO RELATED APPLICATIONS

The present utility patent application claims priority to and the benefit of U.S. Provisional Patent Application Ser. No. 62/395,797, filed Sep. 16, 2016, entitled "SEAL WITH SIDING CHANNEL," the contents of which are incorporated herein in by reference in their entirety.

BACKGROUND OF THE INVENTION

Seals for slide out rooms in recreational vehicles, or other applications that require the sealing of openings that are exposed to outdoor elements, are often cumbersome in their use and installation. This is due to several factors. First, the openings for slide out rooms are not standard in that the wall thickness is not always uniform. This often forces the use of many seals to cover various wall thicknesses. It is also possible that the walls are not perfectly even in their thickness. Still further, the construction of recreational vehicles or other outer facing walls includes an inner substrate such as foam, wood or other insulating member that is covered on its exterior surface by a type of exterior covering or siding that is often fiberglass, plastic or metal. At the opening where a slide out room in a recreational is located, the edge of the opening must be finished and sealed to create an aesthetically pleasing and functional design. One way of accomplishing this is to place trim around the opening and then fit a seal to the opening. This can be time-consuming and requires multiple different materials and products that need to be cut, attached and then maintained. This creates inefficiencies in production and can increase cost. There exists a need in the marketplace, therefore, to provide a solution that both provides a visually appealing and functional way of finishing and sealing an opening of an exterior wall such as the opening in which a slide out room is located on a recreational vehicle.

SUMMARY OF THE INVENTION

A seal useful in sealing slide out rooms may be used singularly or in pairs to straddle a wall through which the opening is located. The seal includes a co-extruded block of deformable material in a channel. The channel is configured to receive the siding of an outer wall whereby the siding deforms the block of deformable material to create a seal inside the channel of the seal.

In one advantage of the present disclosure a seal is provided that can be installed on an opening of a wall be placing the seal onto the siding of the wall where the siding is received into a channel on the seal. In this manner, an element-proof seal is created that creates an aesthetically pleasing joint between the wall and the slide out room or other adjacent member.

The present disclosure also describes a method of producing the seal in which at least three different durometer materials are co-extruded.

DETAILED DESCRIPTION OF INVENTION

Figure 1:
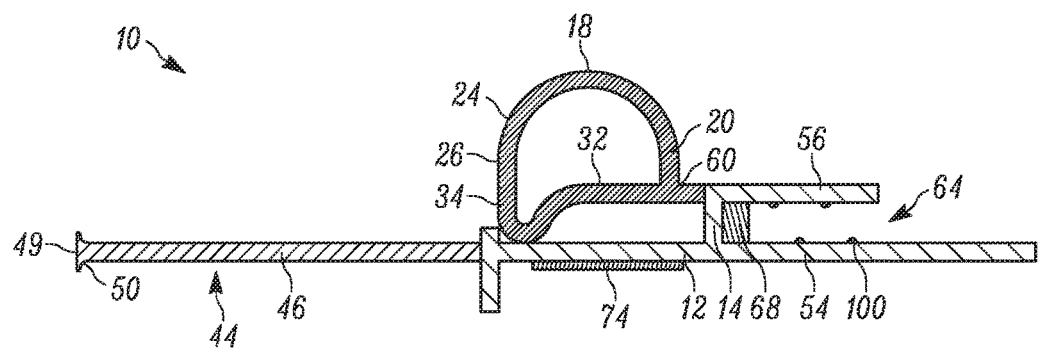
FIG. 1 is a cross-sectional view of the seal of present disclosure.
Figure 5:
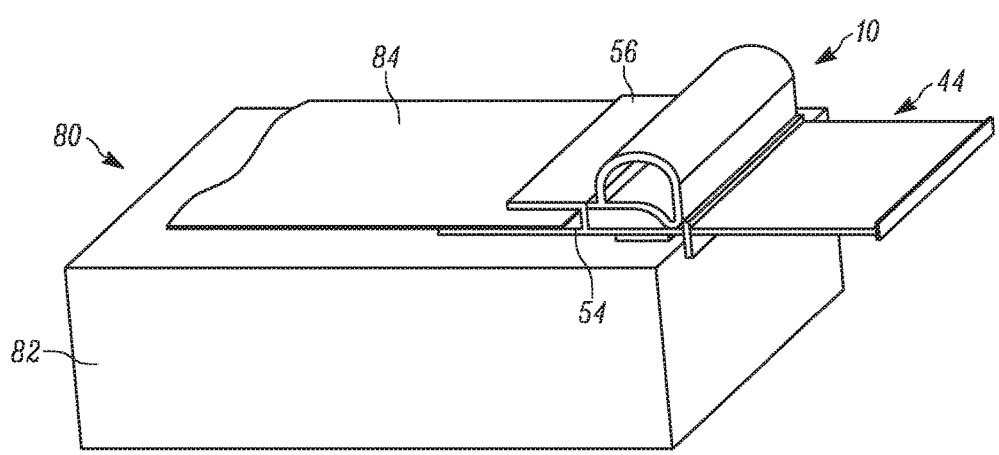
FIG. 5 is a view of one embodiment of the seal of the present disclosure as installed on a wall.

FIG. 1 shows the seal 10 of the present disclosure. This seal is particularly useful in the sealing of slide out rooms used in recreational vehicles, and FIG. 5, shows how the seal 10 is installed for such a purpose. The seal 10 includes a base 12, a first offsetting member 14, base extension 54 and outer extension 56. First offsetting member 14, base extension 54 and outer extension 56 create a C-shaped channel 64 that is configured to receive the siding of an outer wall as will be explained. The base 12, base extension 54 and outer extension 56 are a relatively high durometer material (i.e., Material A, shown in FIG. 2 using the widely spaced hash marks) compared to the rest of the seal, and while resilient to some degree it is substantially less flexible than other parts of the seal 10. The base 12, base extension 54 and outer extension 56 are made, in one embodiment, of a material of approximately 90 shore A.

The first offsetting member 14 extends perpendicularly from the base 12 toward a bulb portion 18. The bulb portion 18 has a second offsetting member 20 that extends toward or is substantially parallel to the first offsetting member 14 and is integrally joined with it at bulb hinge 60. The bulb portion 18 is made of a material that is a lower durometer than the base 12. The bulb portion 18 and its second offsetting member 20 are made, in one embodiment, of a material that is approximately 35 shore A. The bulb portion 18 has an outer arcuate portion 24 that is joined to opposing sidewalls 26. The sidewalls 26 extend into an inner wall 32. In one embodiment, the bulb portion 18 has a flat inner wall 32 that is parallel to the base 12. The inner wall 32 may also include a protrusion 34. The use of the same wall thickness in the protrusion 34, sidewalls 26, and inner wall 32 allows the entire bulb portion 18 to be readily deformable when pressed against the base 12.

Figure 2:
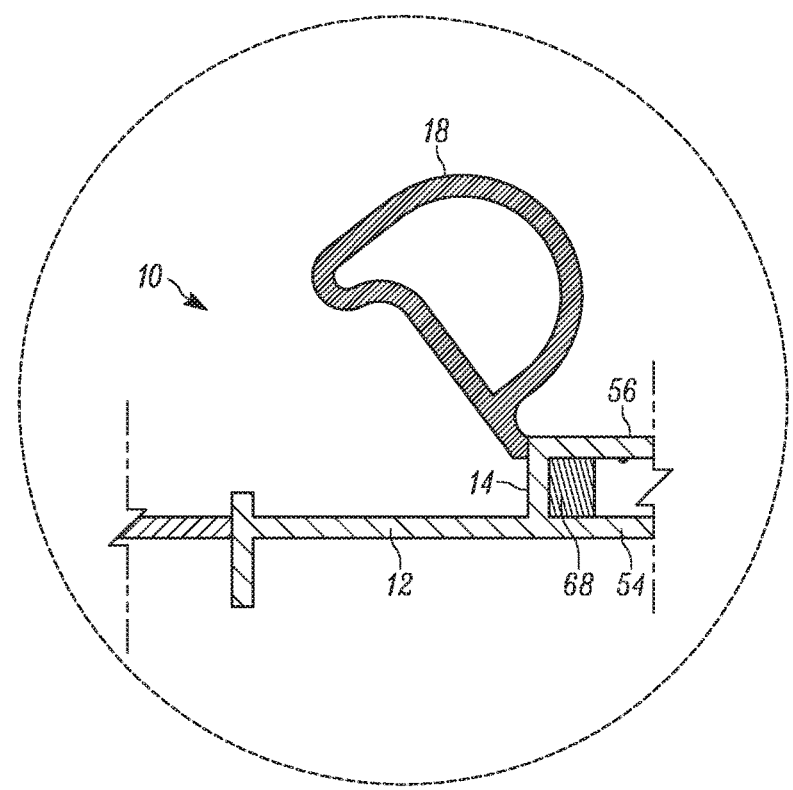
FIG. 2 is a cross-sectional view of the seal of FIG. 1 wherein the bulb is in the second position according to one embodiment of the present disclosure.

A wiper 44 extends co-linearly from the base 12 and is integrally joined at a proximal end 46. A distal end 49 is cantilevered with respect to the proximal end 46. The wiper 44 has lateral sides 51 that are substantially parallel and the distal end 49 includes a flared tip 50. It is also contemplated that the lateral sides may in some cases not be parallel if non-uniform cross sections are desired. For instance, a taper narrowing toward the distal may be used. The wiper 44 is made of a lower durometer material than that of the base 12. The wiper 44 material, in one embodiment, is approximately 35 shore A hardness. As shown in FIG. 2, wiper 44 and bulb 18 may be made of the same material (i.e., Material B, as shown by the narrow hashes). As such, even though the wiper 44 and base 12 have roughly the same thickness, the wiper 44 is substantially more flexible than the base 12.

Figure 11:
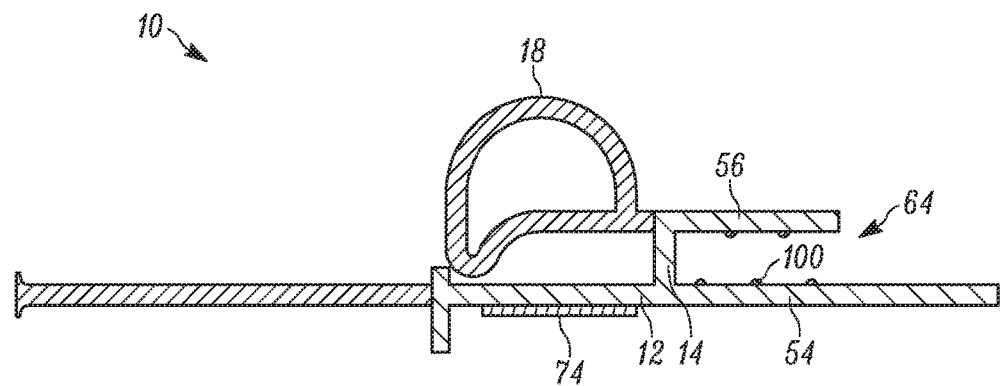
FIG. 11 is a cross-sectional view of yet another embodiment of the present disclosure.
Figure 12:
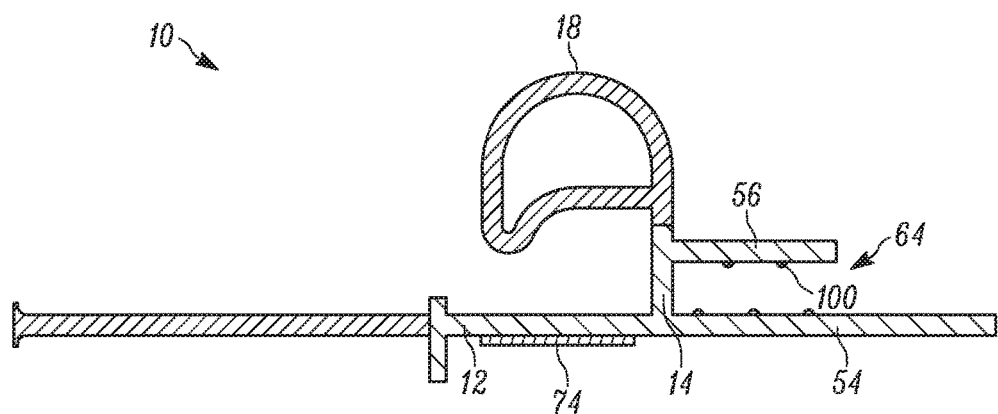
FIG. 12 is a cross-sectional view of yet another embodiment of the present disclosure.

The seal 10, in one embodiment, is coextruded so the transitions between materials are integrally joined. The locations of the lower and higher durometer materials are placed to provide predictable bending of the seal 10. Offsetting member 14 provides a distance allowing for the bulb portion 18 to have a first position, shown in FIG. 1, where the inner wall 32 is spaced parallel to the base 12 a distance equal to the distance of offsetting member 14. The protrusion 34 in this first position touches the base 12 at its terminal end 36 in this first position. In some cases it may be desirable that the distance of the offsetting members 14 is greater than the protrusion 34 so the terminal end 36 does not touch the base 12 in the first position. Some embodiments showing this type of configuration of seal 10 are shown in FIGS. 11 & 12.

Referring back to FIG. 1, seal 10, in this embodiment and in its first position, completely encloses and covers the base 12. The resiliency of the offsetting members 14, 20 bias the cantilevered bulb portion 18 into the first position shown in FIG. 1. Offsetting member 14 provides predictable bending that allows the bulb portion 18 to be bent into a second position shown in FIG. 2. Second offsetting member 20 being of a softer durometer yields at bulb hinge 60 to provide a bendable hinge while the first offsetting member 14 does not move. The single connection to the bulb portion 18 to the base through offsetting member 14 provides a sufficient gap between the inner wall 32 and base 12 to accommodate fasteners that may be driven through the base 12 into a wall to secure seal 10 around an opening such as an opening of a recreational vehicle where a slide out room is located.

Figure 10:
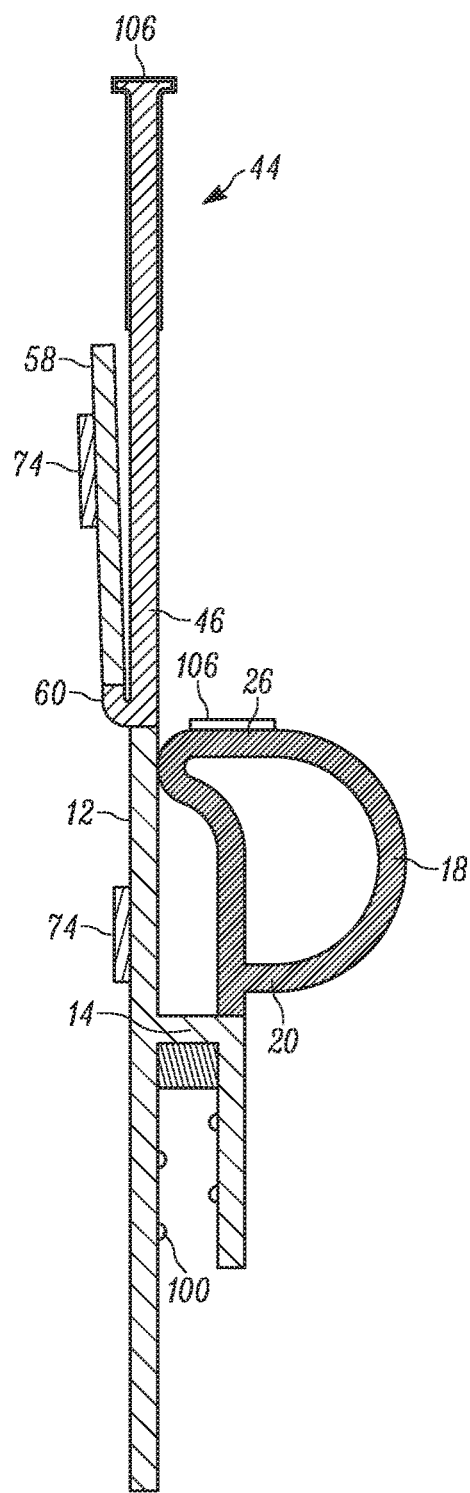
FIG. 10 is a cross-sectional view of still another embodiment of the present disclosure wherein the seal is disposed in a shipping configuration.

As shown in the embodiment of FIG. 10, seal 10 may additionally include locating leg 58 that extends perpendicularly with respect to the base 12 and is joined with a hinge 60 where the proximal end 46 of the wiper 44 joins the base. The entire locating leg 58 is farther from the offsetting members 14, 20 than the outermost portion of the sidewall 26 nearest the wiper 44. Therefore, the entire bulb portion 18 is between the outermost portion of the offsetting members 14, 20 and the surface of the locating leg 58 facing the offsetting members 14, 20. The locating leg 58, in one embodiment, is made from the same durometer material (Material A) as the base as shown in FIG. 10. As further shown in FIG. 10, locating leg 58 is in its second position, in which leg 58 is folded adjacent to the wiper 44. This second position is particularly important for transportation of the seal 10 before it is installed. As can be appreciated, in its first position, locating leg 58 extends in a configuration that is perpendicular to the base 12. The locating leg 58 has a single leg hinge 60 that consists of a single thinned section that is on the same side of the leg 58 as the wiper 44. This configuration permits locating leg 58 of seal 10 to be rotated into its second position. Because of the shape of the seal 10 in its second position, it can easily be coiled so that desired lengths may be cut from a much larger roll of the seal 10.

Figure 3:
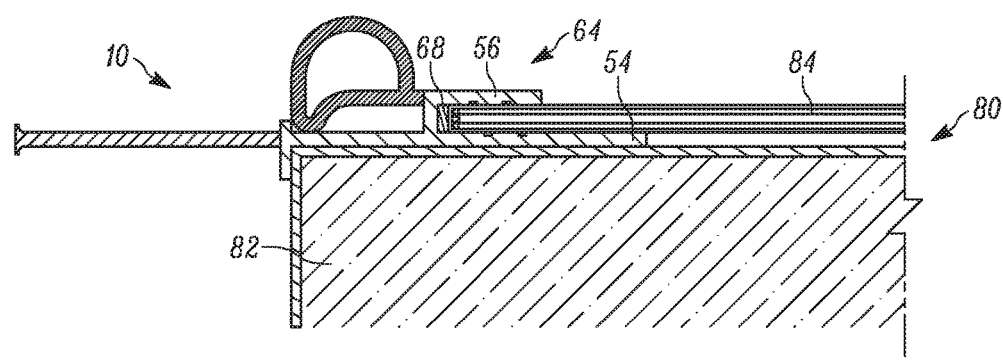
FIG. 3 is a cross-sectional view of a seal of the present disclosure as installed on a wall.
Figure 4:
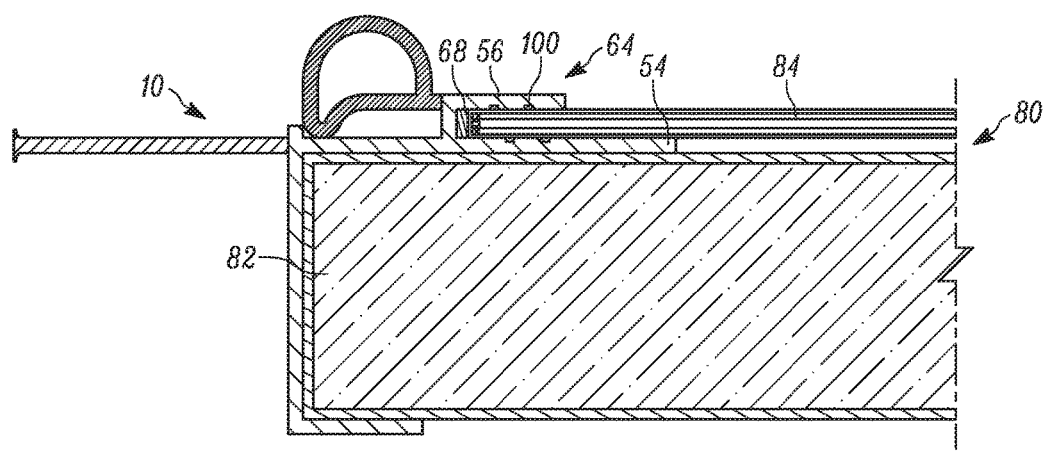
FIG. 4 is a cross-sectional view of another embodiment of the seal of the present disclosure as installed on a wall.

Seal 12, in one embodiment, may include channel 64. Channel 64 is a pocket of material with a C- or U-shape as shown that is defined by offsetting member 14, base extension 54 and outer extension 56. Additionally included in channel 64, according to one embodiment, is deformable block 68. Base extension 54 and outer extension 56 are portions of seal 10 that are configured to receive an exterior covering of a wall onto which seal 10 is secured. As shown in FIGS. 3, 4 & 5, seal 10 can be fit onto an opening in an exterior wall 80, such as an opening in an exterior wall of a recreational vehicle in which a slide out room is located. Wall openings in need of sealing with a seal such as seal 10, often include a substrate 82 and an exterior covering or siding 84. Substrate 82 is often the insulating and structural material of wall 80 and siding 84 protects and/or shields substrate 82 against the elements. Channel 64 is configured to receive siding 84. As such, the height of offsetting member 14 is larger than a thickness of siding 84 so that siding 84 can fit inside of channel 84 and reside substantially between base extension 54 and outer extension 56. In order to provide suitable support, in one example, base extension 54 is longer than outer extension 56. Other configurations or relative sizes of the elements of channel 64 are also contemplated.

As previously described and as shown in FIGS. 1 to 4, seal 10 also includes deformable block 68. Block 68 is a volume of material deposited in channel 64. Block 68 in one embodiment is positioned adjacent offsetting member 14 at the innermost position in channel 64. Block 68, in one example, is co-extruded with the other materials of seal 10. The material of block 68 is a deformable material that permits siding 84 to deform or pierce the original shape of block 68. After seal 10 is inserted onto an exposed edge of siding 84, block 68 contacts the edge of siding 84 and deforms around siding 84. Block 68 is made of a deformable material that has both sealing and adhesive properties. In this manner, channel 64 is retained onto siding 84 due to the adhesive or semi-adhesive properties of the material of block 68. Additionally, a waterproof and airproof seal is created at the joint of siding 84 to block 68 in channel 64. In one embodiment, block 68 is made of a sealant material such as butyl. Other suitable materials can also be used. As shown in FIGS. 1 & 2, block 68 is extruded in a rectangular shape in channel 64. Block 68, however, may have other profiles or shapes including arched or rounded shapes as well as other suitable profiles. In the example shown, block 68 is co-extruded with the other materials that make up seal 10. In other examples, however, block 68 can be inserted into channel 64 by injection, spraying or other suitable process known to one of ordinary skill in the art.

As shown, for example in FIGS. 10 through 12, in an embodiment a plurality of nodules 100 are located in the channel 64 along opposing surfaces of the outer extension 56 and the base extension 54. The plurality of nodules 100 may be made of the same material (e.g., Material B, as indicated) as the wiper 44 and bulb 88 such that the plurality of nodules 100 are more deformable than the outer extension 56 and the base extension 54. When pressed against a siding 84, the plurality of nodules 100 deform, thereby increasing the friction between the plurality of nodules 100 and the siding 84 and increasing the seal therebetween. As shown, each of the plurality of nodules 100 on the base extension 54 may be offset from each of the plurality of nodules on the outer extension 56, such that the nodules 100 are spaced apart from one another.

As shown for example in FIGS. 6 through 9, in an embodiment, one or more nodules 100 may be located on the surface of the base extension 54 that is opposite the channel and/or on the surface of the base 12 itself where the seal 10 contacts the substrate 82. As discussed above, each of these nodules 100 may be made of the same material as the wiper 44 and bulb 88 such that the nodules are more deformable than the outer extension and the base extension 54. These nodules 100 deform when pressed against the substrate 82 so as to improve the seal with the substrate 82.

Figure 6:
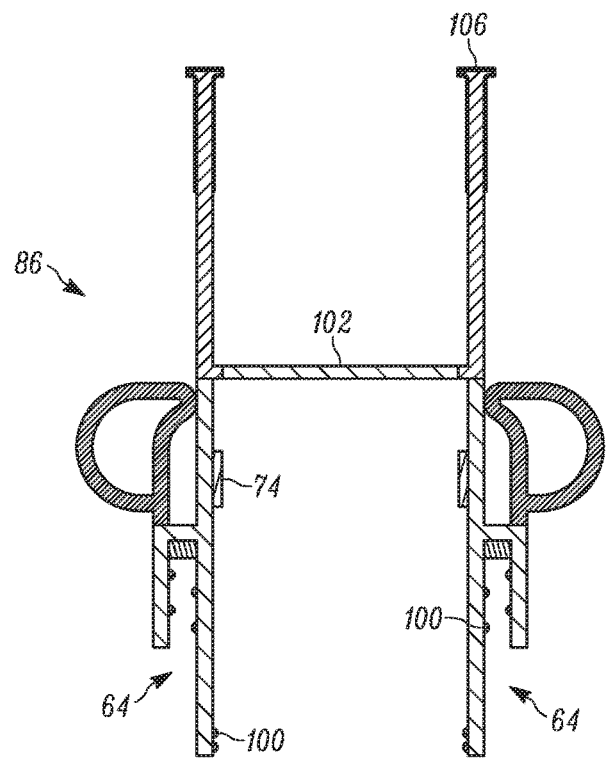
FIG. 6 is a cross-sectional view of another embodiment of the present disclosure.
Figure 7:
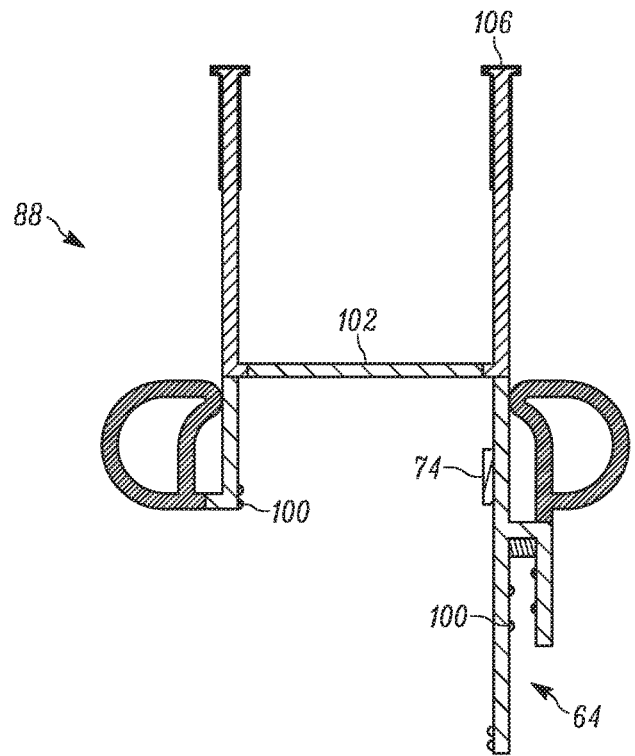
FIG. 7 is a cross-sectional view of yet another embodiment of the present disclosure.

Channel 64 may be included in other variations of seal 10. As shown in FIGS. 6 & 7, a seal 86 or seal 88 may include one or more channels 64. For example, seal 86 includes many of the previously described features and includes a mirrored configuration to create a bridged seal. Seal 86 may also be used on an opening of an outer wall and provides sealing at both the inner and outer surfaces of a wall. As can be appreciated, the first channel 64 can be used in conjunction with an inner side and an inner siding of a wall and the second channel 64 can be used in conjunction with an outer side and an outer siding of a wall.

Figure 8:
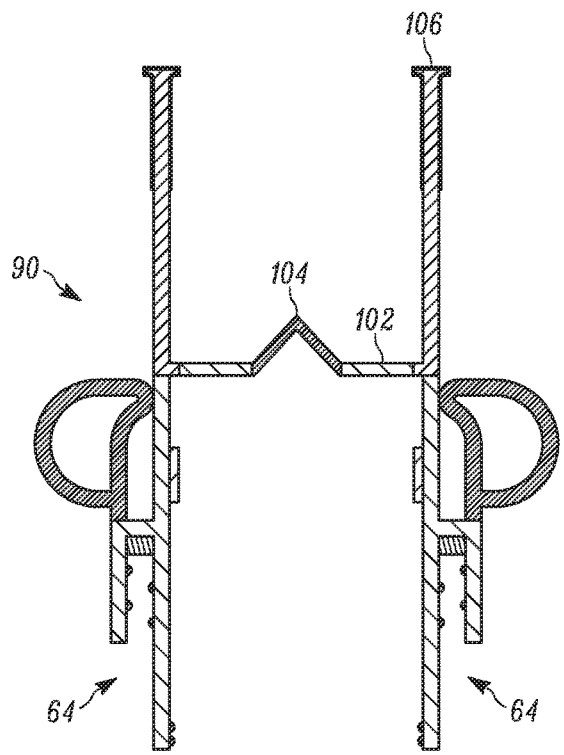
FIG. 8 is a cross-sectional view of yet another embodiment of the present disclosure.
Figure 9:
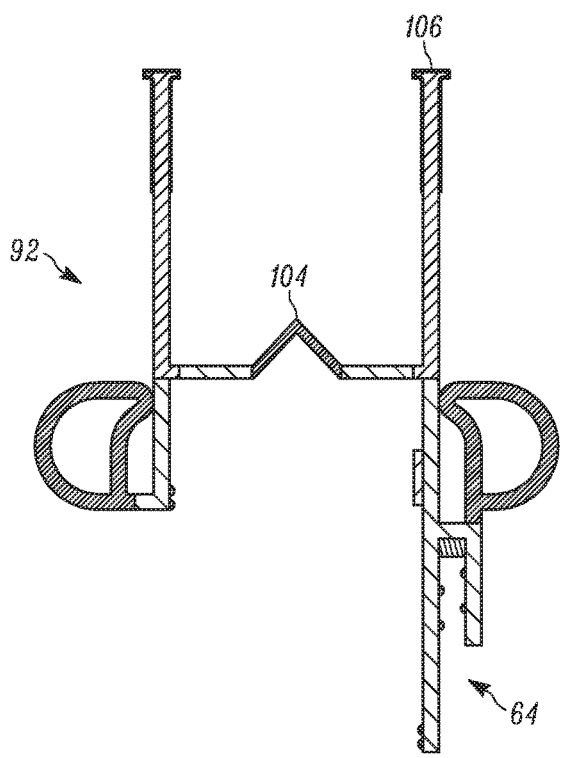
FIG. 9 is a cross-sectional view of yet another embodiment of the present disclosure.

Still further, and as shown in FIG. 7, a seal 88 is contemplated that includes another variation of a bridged seal. In this embodiment, channel 64 is provided for use in connection with the siding of an outer wall but only one such channel 64 is provided. Such a configuration may also be used in a reverse fashion in which channel 64 is used in conjunction with an inner siding on the inner side of a wall. As shown in FIGS. 8 & 9, other embodiments 90 and 92 of a bridged seal with an integral hinge are contemplated. These embodiments may include one or more channels 64 and an integral hinge 104 on the bridge 102 between the mirrored formations of seals 90 and 92. The integral hinge 104 permits seals 90 and 92 to be used in connection with walls that are of varying thicknesses. In an embodiment, the integral hinge 104 may be formed from a section of material of lower durometer than the bridge 102. In an alternative embodiment, only a portion of the integral hinge 104 is made from a section of material of lower durometer than the bridge 102.

Installation of the seal 10 in one intended use is shown in FIG. 5. Wall 80, in one application of seal 10, is a typical recreational vehicle sidewall that receives a slide out room that is not shown. Wiper 44 extends inwardly into the opening and is configured to rub against a sidewall of the slide out room to form a seal. Because of the friction that may be encountered on the wipers 44, an anti-friction coating 106 may be applied to the surface near the flared tips 50. The coating 106, in one example, is between 0.002 and 0.010 inches and has a durometer of 40-90 shore D (Material D). The coating 106 can be a thermoplastic vulcanizate (TPV) that has flexibility in spite of its hardness. This will allow the corners of the tip 50 to conform to the sidewall of the slide out room and be resistant to abrasion. In addition to providing a low friction surface, the coating 106 provides a surface that will not adhere to the surfaces it contacts. As shown in FIG. 10, in an embodiment, the coating 106 is also applied to a portion of the surface of the bulb 18.

Installation of the seal can be accomplished by using adhesive tape 74 to secure the seal 10 in place. Additionally, screws may be driven through the base 12 into wall 80 for additional security in retaining the seal 10 in its desired location. This is done by bending the bulb portion 18 to its second position and then letting the bulb portion 18 snap back into its first position. This will conceal screws driven into the base 12.

The foregoing described seal can be installed along one or more edges of an opening of a wall such as an opening in a wall of recreational vehicle in which a slide out room is located. Channel 64 securely retains seal 10 to the wall around the opening and provides a seal and aesthetically pleasing appearance.

The present invention is not limited to the details given above, but may be modified within the scope of the following claims and spirit of the previous description.

What is claimed is:

1. A seal for a siding of a wall, the seal comprising:
   a base;
   an offsetting member extending substantially perpendicularly from the base, wherein a first end of the offsetting member is connected to the base;
   a bulb connected to a second end of the offsetting member;
   a base extension extending substantially co-linearly from the base;
   an outer extension extending substantially perpendicularly from the second end of the offsetting member, wherein the outer extension is substantially parallel to the base extension and the base extension, the offsetting member, and the outer extension cooperatively define a channel configured to receive the siding of the wall; and
   a deformable block positioned in the channel adjacent the offsetting member configured to deform around the siding and provide a sealed joint when the siding is received into the channel;
   wherein the base extension, the offsetting member, and the outer extension are made of a first material;
   wherein the deformable block is made of a second material; and
   wherein the durometer of the first material is greater than the durometer of the second material.

2. The seal as claimed in claim 1, further comprising:
   wherein the bulb is made from a third material; and
   wherein the durometer of the third material is less than the durometer of the first material and greater than the durometer of the second material.

3. The seal as claimed in claim 2, wherein the first material is approximately 90 shore A, the third material is approximately 35 shore A, and the second material is substantially butyl.

4. The seal as claimed in claim 2, wherein the first material, the second material, and the third material are co-extruded.

5. The seal as claimed in claim 1, wherein one or more nodules with a durometer less than that of the first material are located in the channel.

6. The seal as claimed in claim 1, wherein one or more nodules with a durometer less than that of the first material are located on a surface of said outer extension opposite the channel.

7. The seal as claimed in claim 1, wherein the bulb is made from a material with a durometer lower than that of said base, said bulb being movable by a bulb hinge between a first position in which an inner wall of the bulb is substantially parallel to and spaced from said first base, and a second position in which said bulb portion is bent away from said base so that said inner wall is spaced farther from said base than in said first position.

8. The seal as claimed in claim 7 wherein said bulb hinge is composed of a material having a lower durometer than said base.

9. The seal as claimed in claim 1 further comprising a wiper extending substantially co-linearly from said base, said wiper having a proximal end integrally joined to said base and a distal end opposite said proximal end.

10. The seal as claimed in claim 9, wherein said wiper includes a flared tip at said distal end being wider than a portion of said first wiper adjacent to said flared tip.

11. The seal as claimed in claim 10, wherein said flared tip includes a coating having a higher durometer than said wiper.

12. The seal as claimed in claim 11, wherein said coating is also applied to a portion of said bulb.

13. The seal as claimed in claim 12, wherein said coating is approximately 0.002-0.010 inches thick.

14. The seal as claimed in claim 13, wherein said coating is applied to a portion of said bulb to a thickness of 0.002-0.010 inches thick.

15. A seal for a siding of a wall, the seal comprising:
a first base;
a second base;
a bridge member extending substantially perpendicularly between the first base and the second base;
a first offsetting member extending substantially perpendicularly from the first base, wherein a first end of the second offsetting member is connected to the first base;
a second offsetting member extending substantially perpendicularly from the second base, wherein a first end of the second offsetting member is connected to the second base;
a first bulb connected to a second end of the first offsetting member;
a second bulb connected to a second end of the first offsetting member;
a base extension extending substantially co-linearly from the first base;
an outer extension extending substantially perpendicularly from the second end of the first offsetting member, wherein the outer extension is substantially parallel to the base extension and the base extension, the first offsetting member, and the outer extension cooperatively define a channel configured to receive the siding of the wall; and
a deformable block positioned in the channel adjacent the offsetting member configured to deform around the siding and provide a sealed joint when the siding is received into the channel.

16. The seal as claimed in claim 15, wherein said bridge member includes an integrally formed hinge said hinge being movable between a first position being substantially perpendicular to said first base and said second base and a second position being oblique to said first base and said second base whereby a lateral distance between said first base and said second base is reduced.

* * * * *